United States Patent [19]

Mills

[11] 4,406,129
[45] Sep. 27, 1983

[54] SATURATED CRYOGENIC FUEL SYSTEM

[75] Inventor: Gary L. Mills, Boulder, Colo.

[73] Assignee: Beech Aircraft Corporation, Wichita, Kans.

[21] Appl. No.: 329,670

[22] Filed: Dec. 11, 1981

[51] Int. Cl.³ ............................................. F25B 19/00
[52] U.S. Cl. ............................................. 62/7; 62/51; 62/55; 137/539.5
[58] Field of Search ............................. 62/7, 51, 55; 137/539.5

[56] References Cited

U.S. PATENT DOCUMENTS

| | | | |
|---|---|---|---|
| 2,456,889 | 12/1948 | Olson | 62/51 |
| 2,456,890 | 12/1948 | St. Clair | 62/51 |
| 2,747,374 | 5/1956 | Thompson | 62/51 |
| 3,001,375 | 9/1961 | Tauscher | 62/51 |
| 4,080,800 | 3/1978 | Spaulding | 62/51 |

*Primary Examiner*—Ronald C. Capossela

*Attorney, Agent, or Firm*—Edward L. Brown, Jr.

[57] ABSTRACT

A cryogenic fuel system for an internal combustion engine utilizing both the liquid and vapor of a saturated liquid fuel comprising an insulated storage tank having inner and outer walls a vapor tube passing through the walls of the tank with its open end positioned approximate the top of the tank above the liquid level and its opposite end connected to the engine; a liquid entry and exit tube passing through the walls of the tank with a portion of the tube at or above the open end of the vapor tube, the liquid tube extending downwardly to the bottom portion of the tank to its open end; a first pressure-actuated valve means positioned in the vapor tube having an open or closed position which opens the vapor tube to the engine when the tank pressure exceeds a predetermined pressure; and a second valve means in the liquid tube having an open and closed position which opens the liquid tube to the engine when the engine is running.

10 Claims, 1 Drawing Figure

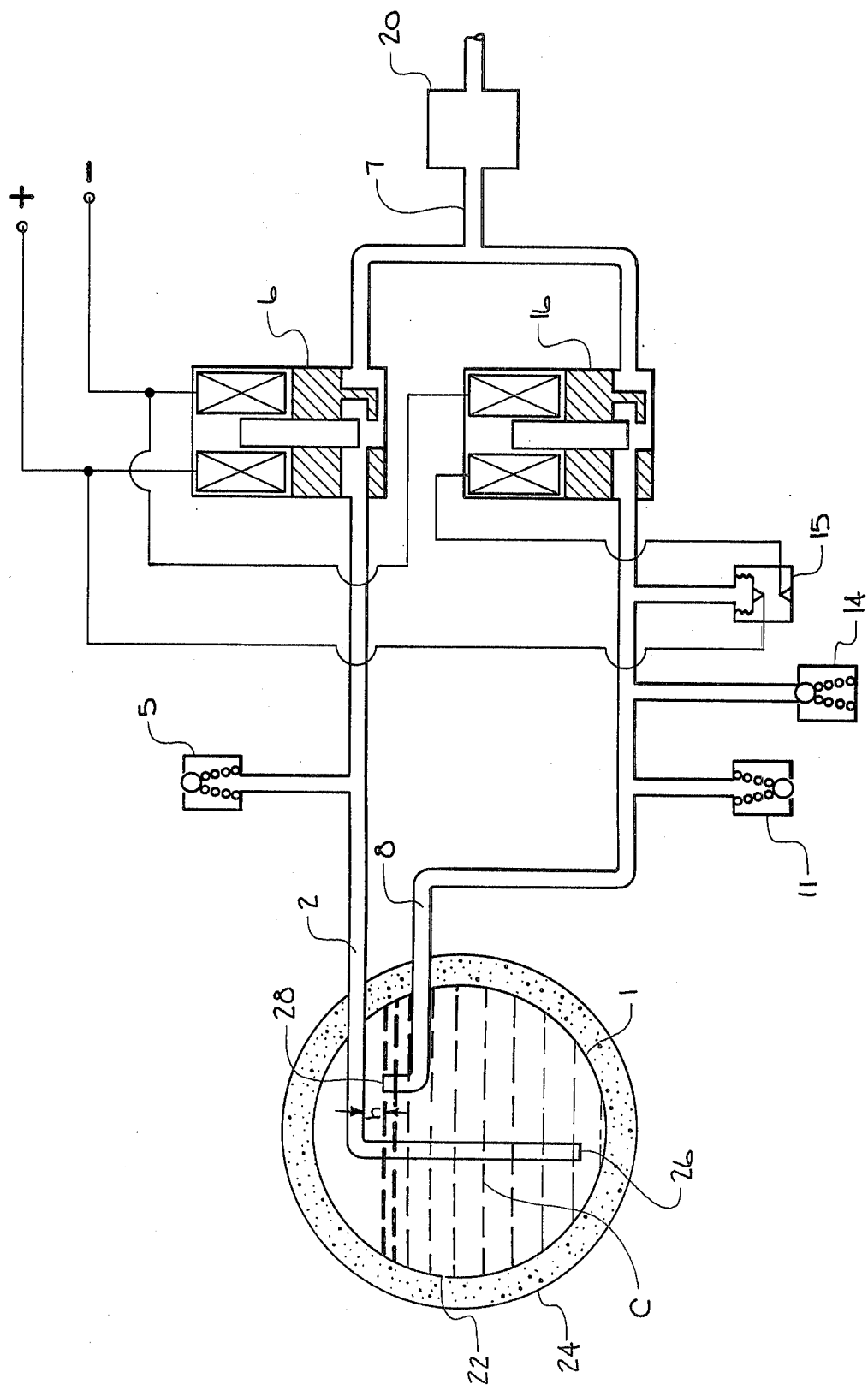

SATURATED CRYOGENIC FUEL SYSTEM

BACKGROUND OF THE INVENTION

This invention relates generally to cryogenic fuel storage and more specifically to an LNG fueling system for internal combustion engines utilizing saturated cryogenic fuels in a system which mixes both liquid and vapor before supplying the engine.

Fuels such as liquefied natural gas (LNG) or liquid hydrogen are stored in insulated tanks in which either the liquid or vapor can be delivered to an engine on demand. Systems such as illustrated in U.S. Pat. No. 4,080,800, deliver the fluid or vapor without outside pressurization and are referred to as "saturated liquid" systems. Systems of this type supply their own pressurization by the vaporization of liquid.

Normally the liquid and vapor lines of such a fuel system are controlled by separate valves before they are joined together as they flow into the mixing valve of the engine. These valves are conventional open and close two-position valves which open in the fluid line normally when the pressure drops below a certain rate while the valve in the vapor line remains closed until the pressure in the tank exceeds a certain elevated level. Once the vapor is allowed to flow to the engine, the pressure in the tank drops quickly. The vapor flow alone is normally not adequate to provide the amount of flow at high engine demand levels which can cause supply line starvation or erratic engine performance.

Some prior art systems vent the high pressure vapor to atmosphere across a relief valve rather than utilize the vapor in the engine. A more efficient system for effective operation requires that there be means for permitting both vapor-phase flow and liquid-phase flow to meet the varying demands of the vehicle engine and keep sufficient pressure in the tank.

Storing cryogenic fuels in a saturated liquid state is most desirable since it provides a means for expulsion of the fuel at high flow rates without the need for auxiliary pressurization. A cryogenic fuel as a saturated liquid is a condition wherein the liquid is in equilibrium with the vapor. However, due to the influx of heat into the cryogenic liquid which raises its saturation pressure, it is desirable to occasionally supply vapor alone to the engine, which lowers the saturated pressure of the liquid and vapor. In saturated liquid storage systems this has previously been done by having separate on/off pressure-actuated solenoid valves wherein the vapor line valve opens at relatively high pressures and the liquid line valve opens only at low pressure levels. However, there are several drawbacks to this method of pressure control. If, for example, the valves are both opened simultaneously, a rapid pressure increase sometimes occurs due to the pressurization loop that is formed.

In U.S. Pat. No. 4,080,800 previously mentioned, a saturated liquid system is described which attempts to solve the above-mentioned problems utilizing check valves and a pressure-actuated three-way valve.

SUMMARY OF THE INVENTION

Most prior art systems provide the liquid from a line exiting the bottom of the tank with a liquid head pressure which combines with the vapor pressure in the tank. The present invention inverts the fluid line and exits the tank in its upper portions with a portion of the liquid line above or at least level with the maximum liquid level of the tank. With this high fluid exit there is no pressurization loop and the tank will substantially empty before tank pressure is lost.

It is the principal object of the present invention to provide a simple method of fuel expulsion from a saturated cryogenic fuel from full tank to empty tank conditions.

Another object of the present invention is to provide an improved tank design which exits the fluid and vapor lines from the top of the tank.

Another object of the present invention is to provide a simple method of combining the liquid and vapor flow from a cryogenic tank, which does not require any specially-designed valves.

Other objects and advantages of the present invention will become more apparent to those skilled in the art from the following detailed description which proceeds with references to the accompanying drawing.

DESCRIPTION OF THE PREFERRED EMBODIMENT

Referring to the drawing which illustrates the preferred embodiment of the present invention; the circuit, generally described by reference numeral 10, incorporates a storage tank 1 having inner and outer walls 22 and 24, for a selected cryogen c. The tank 1 may be insulated in accordance with techniques well known in the cryogenic art to maintain the contained cryogen in a liquid state.

The liquid fuel is supplied and withdrawn from tank 1 through tube 2 which passes through the side walls 22 and 24 approximate the top portion of the tank and extends downwardly to the bottom portion of the tank to its open end 26. Connected to tube 2 outside tank 1 is a conventional fill valve 5 for supplying additional fuel when necessary. Also located in tube 2 is a solenoid-actuated valve 6 which controls the flow of liquid into the engine supply line 7. Supply line 7 in turn connects to the engine air mixing chamber 20 (symbolically shown).

The fuel vapor is withdrawn from the tank 1 through tube 8, which has an open end 28 positioned near the top of the tank, the level of which determines the maximum fluid fill level of the tank. Tube 8 passes through the side walls of the tank 1 and joins downstream with liquid tube 2 at the juncture point with engine supply line 7. Opening into vapor tube 8 is a conventional fill valve 11 which is opened to atmosphere, venting the vapors, during the fill operation. Also connected to vapor tube 8 is a conventional relief valve 14 which opens and vents vapor when the use of vapor by the engine is not sufficient to keep the pressure below a certain level. Also located in vapor tube 8 is a solenoid-actuated valve 16 which controls the flow of vapor to engine supply line 7. Pressure switch 15, which senses the vapor pressure in tube 8, is connected to the electrical circuit which operates solenoid valve 16. Until the pressure reaches a certain level in tube 8, the solenoid valve 16 cannot be energized even though valve 6 has been energized.

The height of the liquid tube 2 is always at least the height of the maximum level or greater. The drawing illustrates a full tank with a height "h" of the liquid tube above the full liquid level.

OPERATION

In operation the tank 1 is filled with the liquid cryogen c through valve 5 while valve 11 is vented to atmosphere, until liquid is sensed at valve 11. The thermodynamic state of the cryogenic liquid put in the tank is such that when it assumes equilibrium with the vapor in the form of a saturated liquid, the pressure in the tank is sufficient to expell the liquid from the tank until it is empty. When solenoid valve 6 and 16 are not energized, they are both closed. Normally, the liquid valve 6 is open and the vapor valve 16 is closed and only liquid is expelled into the engine supply line 7. The solenoid valve 6 is held open by electrical power from a circuit which is energized when the engine is running. The solenoid valve 16 is held open from a circuit which is energized when the engine is running and when the pressure switch 15 is caused to close, or in other words, the pressure in vapor tube 8 is above a set level. If heat influx through the tank insulation 17 raises the pressure in the tank 1 to the actuation pressure of switch 15, valve 16 will open. Solenoid valve 16 will remain open as long as the pressure switch 15 remains closed. With the liquid and vapor valves 6 and 16 open, liquid and vapor are expelled by the pressure in tank 1 into engine supply line 7 and in turn into mixing chambeer 20 before it enters the engine. The pressure in tank 1 rapidly decreases with the vapor valve 16 open, until the pressure drops below the actuating level of the pressure switch 15; whereupon the pressure switch 15 open, causing the vapor solenoid valve 16 to close and remain closed. With the liquid solenoid valve 6 open, only liquid will be expelled from the tank 1 into the liquid supply line 7. Since the cryogenic fuel c is in a saturated condition, the exhausted liquid will not cause any substantial pressure drop in the tank, and the vapor pressure in the tank will remain adequate to expell all of the fluid from the tank.

The mixing chamber 20 not only mixes the gaseous fuel with air but also functions as a heat exchanger and pressure regulator.

Having described the invention with sufficient clarity to enable those familiar with the art to construct and use, I claim:

1. A cryogenic fuel system for internal combustion engines utilizing both the liquid and vapor of a saturated liquid fuel comprising:
   an insulated storage tank having inner and outer walls;
   a vapor tube passing through the walls of the tank with its open end positioned approximate the top of the tank above the liquid level;
   a liquid entry and exit tube passing through the walls of the tank with a portion of the tube at or above the open end of the vapor tube, the liquid tube extending downwardly to the bottom portion of the tank to its open end;
   an air-fuel mixer chamber supplied by the combined flow of the vapor tube and liquid tube;
   a first pressure-actuated valve means positioned in the vapor tube having an open or closed position which opens the vapor tube to the mixer chamber when the tank pressure exceeds a predetermined elevated pressure; and
   a second pressure-actuated valve means in the liquid tube having an open and closed position which opens the liquid tube to the mixer chamber.

2. A cryogenic fuel system as set forth in claim 1, wherein the liquid tube passes through the vessel walls above the level of the open end of the vapor tube.

3. A cryogenic fuel system as set forth in claim 1, wherein the liquid tube rises above the level of the open end of the vapor tube and then descends below said level and passes through the walls of the tank.

4. A cryogenic fuel system as set forth in claim 1, wherein the open end of the vapor tube acts to limit the maximum liquid level in the tank.

5. A cryogenic fuel system as set forth in claim 1, wherein the valve on the vapor tube is a solenoid valve and is controlled by a pressure switch sensing pressure in the vapor tube.

6. A cryogenic fuel system as set forth in claim 1, wherein the valve on the vapor tube is a pressure-actuated valve and is controlled by the pressure within the tank relative to a constant pressure such as the atmosphere.

7. A cryogenic fuel system as set forth in claim 1, wherein the valve on the liquid tube is a solenoid valve and is actuated by an electrical circuit that is energized when the engine is running.

8. A cryogenic fuel system as set forth in claim 1, wherein the vapor tube is connected to the liquid tube upstream of a solenoid-actuated liquid valve, and downstream of the vapor valve so that the liquid valve controls the flow of both liquid and vapor to the engine.

9. A cryogenic fuel system as set forth in claim 1, wherein the vapor tube is connected to the liquid tube upstream of a pressure-actuated liquid valve and downstream of the vapor valve so that the liquid valve controls the flow of both liquid and vapor to the engine.

10. A cryogenic fuel system for an internal combustion engine utilizing both the liquid and vapor of a saturated liquid fuel comprising:
    an insulated storage tank having inner and outer walls;
    a vapor tube passing through the walls of the tank with its open end positioned approximate the top of the tank above the liquid level and its opposite end connected to the engine;
    a liquid entry and exit tube passing through the walls of the tank with a portion of the tube at or above the open end of the vapor tube, the liquid tube extending downwardly to the bottom portion of the tank to its open end;
    a first pressure-actuated valve means positioned in the vapor tube having an open or closed position which opens the vapor tube to the engine when the tank pressure exceeds a predetermined pressure; and
    a second valve means in the liquid tube having an open and closed position which opens the liquid tube to the engine when the engine is running.

* * * * *